United States Patent [19]
Campbell et al.

[11] Patent Number: 5,844,701
[45] Date of Patent: Dec. 1, 1998

[54] SYSTEM AND METHOD USING LINEAR TRANSLATION TO ACCESS DATA LOCATIONS IN A HOLOGRAPHIC MEMORY

[75] Inventors: Scott Patrick Campbell, Chatham; Kevin Richard Curtis, Summit; Michael C. Tackitt, Califon, all of N.J.

[73] Assignee: Lucent Technologies Inc., Murray Hill, N.J.

[21] Appl. No.: 881,579

[22] Filed: Jun. 24, 1997

[51] Int. Cl.$^6$ ............... G03H 1/30; G03H 1/26; G11C 13/04
[52] U.S. Cl. ............... 359/25; 359/22; 365/125
[58] Field of Search ............... 359/11, 21, 22, 359/24, 25, 29, 30, 31; 365/124, 125

[56] References Cited

U.S. PATENT DOCUMENTS 4,034,355  7/1977  Carlsen ............... 365/125

*Primary Examiner*—Jon W. Henry
*Assistant Examiner*—Jared Treas

[57] ABSTRACT

Systems and methods for steering a complex, spatially-modulated incident beam of light from a spatial light modulator to gain access to data locations in a holographic memory cell (HMC). One of the systems includes (1) a primary beam steering system that receives the incident beam of light from the spatial light modulator and produces a resulting beam of light, wherein the primary beam steering system traverses the resulting beam of light across a plane of the HMC in increments having a first magnitude and 2) a fine-control translation mechanism, coupled to the spatial light modulator, that translates the spatial light modulator relative to the primary beam steering system to cause the resulting beam of light to traverse the plane of the HMC in increments having a second magnitude smaller than the first magnitude.

20 Claims, 5 Drawing Sheets

SYSTEM AND METHOD USING LINEAR TRANSLATION TO ACCESS DATA LOCATIONS IN A HOLOGRAPHIC MEMORY

TECHNICAL FIELD OF THE INVENTION

The present invention is directed, in general, to holographic memory devices and, more specifically, to an optical system using linear translating to access data locations in a holographic memory.

CROSS-REFERENCE TO RELATED APPLICATIONS

The present invention is related to that disclosed in:
1. U.S. patent application Ser. No. (Attorney Docket No. CAMPBELL 7-15-4), entitled "System and Method For Steering Focal Plane Data to Access Data Locations in a Holographic Memory" and filed concurrently herewith;
2. U.S. patent application Ser. No. (Attorney Docket No. CAMPBELL 8-16-5), entitled "System and Method for Steering Fresnel Region Data to Access Data Locations in a Holographic Memory" and filed concurrently herewith;
3. U.S. patent application Ser. No. (Attorney Docket No. CAMPBELL 9-17-6), entitled "System and Method for Precessing an Optical Path Using Cylindrical Coordinates to Access Data Locations in a Holographic Memory" and filed concurrently herewith;
4. U.S. patent application Ser. No. (Attorney Docket No. CAMPBELL 10-18-7), entitled "System and Method for Steering Focal Plane Data Using Cylindrical Coordinates to Access Data Locations in a Holographic Memory" and filed concurrently herewith; and
5. U.S. patent application Ser. No. (Attorney Docket No. CAMPBELL 11-19-8), entitled "System and Method for Steering Fresnel Region Data Using Cylindrical Coordinates to Access Data Locations in a Holographic Memory" and filed concurrently herewith.

Each reference is commonly assigned with the present invention.

BACKGROUND OF THE INVENTION

Most modern processing systems, including personal computers (PCs), rely on one form or another of optical data storage. For example, CD-ROM drives are now standard equipment on nearly all new PCs. Nearly all multimedia software, including video games, maps, encyclopedias, and the like, are sold on CD-ROM. Also, compact discs are the most prevalent storage medium for musical recording. More recently, digital video disc (DVD) technology has been introduced that will expand the storage capacity of standard CD technology from about one-half gigabyte to about five gigabytes.

The large storage capacities and relatively low costs of CD-ROMs and DVDs have created an even greater demand for still larger and cheaper optical storage media. Many large businesses rely on jukebox-style CD changers in order to access a particular one of potentially hundreds of discs. Motion pictures released in optical storage format still require multiple CDs, DVDs or oversized laser discs. However, it appears that the limits of CD-ROM and DVD technology are being reached. In order to continue to improve the capacity and speed of optical storage systems, research increasingly focuses on holographic storage devices capable of storing hundreds of gigabytes in a CD-sized storage medium.

A number of holographic data storage systems have been developed that are capable of storing and retrieving an entire page of data at a time. In these systems, data to be stored is first encoded in a two dimensional (2D) optical array, for example on a liquid crystal display (LCD) screen, which is one type of spatial light modulator (SLM). Another type of SLM is Texas Instruments' Digital Mirror Device, which is a reflective device that allows the reflectivity of each pixel to be changed. The term "SLM" also includes fixed masks of varying optical density, phase, or reflectivity.

A first laser beam, a plane wave, is transmitted through the SLM and picks up an intensity and/or phase pattern from the data squares or rectangles (pixels) in the 2D array. This data-encoded beam, called an object beam, is ultimately projected onto and into a light-sensitive material, called a holographic memory cell (HMC). A second laser beam, called a reference beam, is also projected onto and into the HMC. The object beam and the reference beam then cross at the HMC to produce an interference pattern throughout a volume element of the HMC. This unique interference pattern induces material alterations in the HMC that generate a hologram.

The formation of the hologram in the HMC is a function of the relative amplitudes and polarization states of, and the phase differences between, the object beam and the reference beam. It is also highly dependent on the incident angles at which the object beam and the reference beam were projected onto the HMC. After hologram storage, the data beam may be reconstructed by projecting into the HMC a reference beam that is the same as the reference beam that produced the hologram. The hologram and the reference beam then interact to reproduce the data-encoded object beam, which may then be projected onto a two-dimensional array of light sensitive detectors which read back the data by sensing the pattern of light and dark pixels.

The object beam produced by the spatial light modulator has a high space-bandwidth product (SBP). The SBP of a beam is equal to the number of resolvable pixels the beam contains. For example, the 800×600 pixel image produced by a SVGA computer monitor has a SBP of 480,000. When high SBP beams are projected into an HMC, it is important to keep the optical path lengths traversed by the beams constant. Otherwise, the high SBP image will go out of focus and the data will be lost.

Maintaining a constant optical path length in order to keep the high SBP image of the object beam in focus necessarily makes it difficult to steer the object beam to different areas on the surface of the HMC, because such steering frequently causes the optical path length to change. However, many holographic memory systems incorporate reference beams whose SBP=1. Because of the small reference beam SBP, such a holographic data storage system can project its reference beam through an acousto-optic cell, which diffracts the reference beam through an optical system, such as a 4-f imaging system, that has a fixed optical path length. Altering the frequency of the acoustic wave changes the angle at which the reference beam is diffracted and therefore incident to the surface of the HMC. Systems utilizing such angle-tuned reference beam steering are known as "angle multiplexing" systems and are distinguished by their capability to project different pages of data into the same location on the surface of the HMC, but at different angles of reference-beam incidence. The data is then retrieved by steering the interrogating reference beam at different angles of incidence. However, these prior art systems are inadequate to steer a high SBP beam, such as a typical object beam, to different areas of the HMC because of their inherent limitations with respect to space-bandwidth product throughput. These prior art systems are also limited in their capability to accurately position a high SBP object or reference beam at a desired position on the HMC.

Accordingly, there is a need in the art for improved optical systems that are capable of steering high space-bandwidth product beams to different regions on the surface of an HMC without causing the beam to lose focus. There is a further need in the art for improved optical systems capable of steering high space-bandwidth product images in more than one dimension in a coordinate system. There is also a need in the art for improved optical systems capable of steering complex reference beams in more than one dimension in a coordinate system. There is a still further need in the art for improved optical systems capable of accurately steering a high space-bandwidth product object beam in order to "fine-tune" the position of the output image on the HMC.

SUMMARY OF THE INVENTION

To address the above-discussed deficiencies of the prior art, the present invention provides systems and methods for steering a complex, spatially-modulated incident beam of light from a spatial light modulator to gain access to data locations in an HMC. One of the systems includes: (1) a primary beam steering system that receives the incident beam of light from the spatial light modulator and produces a resulting beam of light, wherein the primary beam steering system traverses the resulting beam of light across a plane of the HMC in increments having a first magnitude and (2) a fine-control translation mechanism, coupled to the spatial light modulator, that translates the spatial light modulator relative to the primary beam steering system to cause the resulting beam of light to traverse the plane of the HMC in increments having a second magnitude smaller than the first magnitude. The plane of the HMC traversed by the resulting beam of light may or may not be a focal plane of the primary beam steering system. Additionally, the plane of the HMC traversed by the resulting beam of light may be the surface plane of the HMC or may lie within the body of the HMC. Furthermore, the plane of the HMC traversed by the resulting beam of light may or may not be parallel to the surface of the HMC.

In one embodiment of the present invention, the fine control translation mechanism rotates the spatial light modulator. Alternatively, the fine control translation mechanism linearly translates the spatial light modulator along a first axis. In this embodiment, the fine control translation mechanism may also linearly translate the spatial light modulator along a second axis orthogonal to the first axis.

In another embodiment of the present invention, the primary beam steering system linearly traverses the resulting beam of light. Alternatively, the primary beam steering system rotates the resulting beam of light.

The HMC employed in one of embodiment of the present invention is substantially planar. Further, in one embodiment, the incident beam has an SBP of at least 100. However, the present invention is employable with nonplanar HMCs or incident beams having an SBP of less than 100, should they be advantageous in a given application.

The foregoing has outlined, rather broadly, various embodiments of the present invention so that those skilled in the art may better understand the detailed description of the invention that follows. More specific embodiments of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
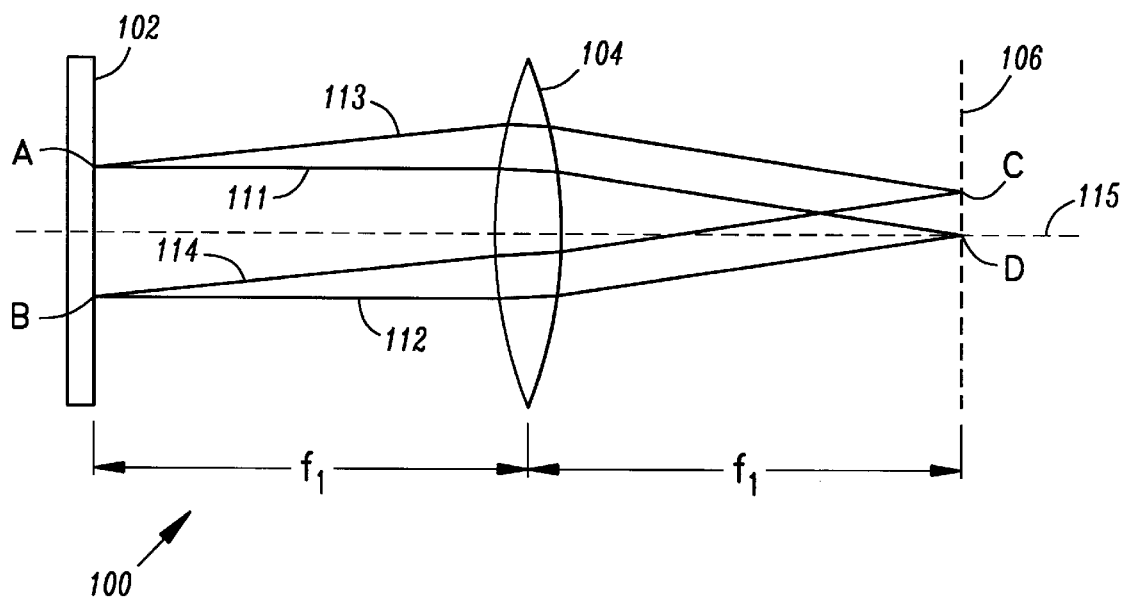
FIG. 1 illustrates a conventional single lens Fourier transforming system.

FIG. 1 illustrates a conventional single lens Fourier transforming system 100. Although Fourier transforms of input objects are well known, Fourier transform system 100 is described here in detail so that the descriptions of the present invention which follow may be more clearly understood. An object beam of coherent laser light is projected through SLM 102 and picks up the encoded data pattern and propagates distance $f_1$ to reach lens 104. The object beam passes through lens 104 and propagates distance $f_1$ again to reach Fourier plane 106. At the Fourier plane, all of the object beam's positional information becomes angular information and all of the object beam's angular information becomes positional information.

This phenomenon may be understood by reference to light beams 111 and 113, which emanate from point A on SLM 102, and to light beams 112 and 114, which emanate from point B on SLM 102. The small pixels in the 2D-array pattern on SLM 102 form small apertures that cause diffraction of the object beam as it passes through SLM 102. Thus, light emanates outward from points A and B over a broad range of directions. Light beams 111 and 112 are parallel to one another and propagate perpendicularly outward from SLM 102. Light beams 113 and 114 are also parallel to one another but propagate outward at an oblique angle from SLM 102. Since light beams 111 and 112 are parallel, their angles of incidence at lens 104 are the same. Similarly, since light beams 113 and 114 are parallel, their angles of incidence at lens 104 are the same.

As is well known, it is a property of a thin lens, such as lens 104, that parallel light beams that pass through the lens are focused (converged) by the lens to the same point at the Fourier plane. Thus, parallel beams 111 and 112 converge at point D in Fourier plane 106, even though beams 111 and 112 emanate from different points at SLM 102. Similarly, parallel beams 113 and 114 converge at point C in Fourier plane 106, even though beams 113 and 114 emanate from different points at SLM 102.

It is also a property of a thin lens, such as lens 104, that light beams emanating at different angles (i.e., nonparallel)

from the same point at the input object (SLM 102) become parallel light beams after passing through the thin lens. Thus, light beams 111 and 113, which emanate at different angles (i.e., nonparallel) from point A at SLM 102, become parallel to each other after passing through lens 104 and therefore have the same angles of incidence at points C and D in Fourier plane 106. Likewise, light beams 112 and 114, which emanate at different angles (i.e., nonparallel) from point B at SLM 102, become parallel to each other after passing through lens 104 and therefore have the same angles of incidence at points C and D in Fourier plane 106.

From the foregoing, it can be seen that the position at which a beam of light is incident on Fourier plane 106 is determined by the angle (not the position) at which it left SLM 102. Similarly, it can be seen that the angle at which a beam of light is incident on Fourier plane 106 is determined by the position (not the angle) at which it left SLM 102. Therefore, as was stated above, at the Fourier plane, all of the object beam's positional information becomes angular information and all of the object beam's angular information becomes positional information.

Figure 2:
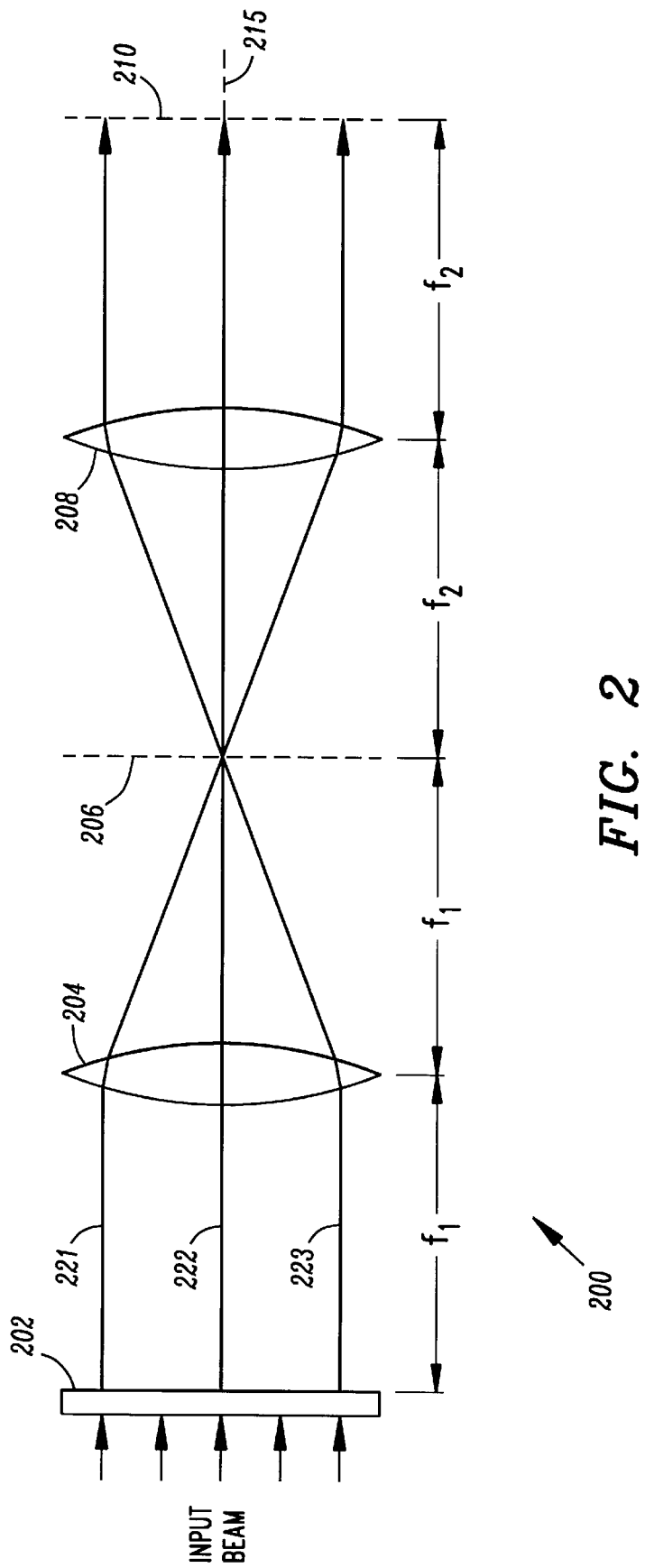
FIG. 2 illustrates a conventional 4-f (four-f) imaging system.

FIG. 2 illustrates a conventional 4-f (four f) imaging system 200. The configuration of 4-f imaging system 200 shown in FIG. 2 is referred to as "infinite conjugate." Although 4-f imaging systems are well known, 4-f imaging system 200 is described here in detail so that the descriptions of the present invention which follow may be more clearly understood. 4-f imaging system 200 comprises spatial light modulator (SLM) 202, thin convex lens 204, which has a focal length, $f_1$, and thin convex lens 208, which has a focal length, $f_2$, where $f_1$ and $f_2$ may or may not be equal. SLM 202 comprises, for example, a liquid crystal display (LCD) screen on which data is encoded in a 2D array pattern of transparent and opaque pixels. SLM 202, lens 204 and lens 208 are positioned orthogonally to optical path 215, shown as a dotted line coincident with solid line 222.

A plane wave object beam of coherent laser light is projected through SLM 202, picks up the encoded data pattern, and propagates distance $f_1$ to reach lens 204. The object beam, represented by light beams 221–223, passes through lens 204 and propagates distance $f_1$ again to reach Fourier plane 206. As explained above with respect to FIG. 1, at Fourier plane 206, all of the object beam's positional information becomes angular information and all of the object beam's angular information becomes positional information.

The image formed at Fourier plane 206 is the input object for lens 208. From Fourier plane 206, the object beam propagates distance $f_2$ to reach lens 208. After passing through lens 208, the object beam finally propagates distance $f_2$ to reach output image plane 210, where the input data object at SLM 202 is reconstructed. Output image plane 210 is the Fourier plane for plane 206, as well as the output image plane for the plane in which SLM 202 lies. Thus, the image formed at output image plane 210 by lens 208 is the Fourier image of the Fourier image formed at Fourier plane 206 by lens 204.

As light beams 221–223 show, the input data object formed at output image plane 210 is inverted with respect to its appearance at SLM 202. Therefore, if an HMC was positioned at output image plane 210, the inverted image of the 2D-array pattern at SLM 202 would be stored as a page of data in the HMC. A separate reference beam of laser light (not shown) would be required in order to store the data object. In alternate embodiments of the above-described optical systems, the spatial light modulator may be positioned between the initial lens and the following Fourier plane. An object beam that is incident to the initial lens will be converged by the initial lens, but will pick up the encoded data from the SLM after, rather than before, the initial lens. In such a configuration, the size (positions) of the Fourier orders vary linearly with the distance between the SLM and the following Fourier plane. Additionally, the incident angles of the beams will vary according to the position of the SLM.

Figure 3:
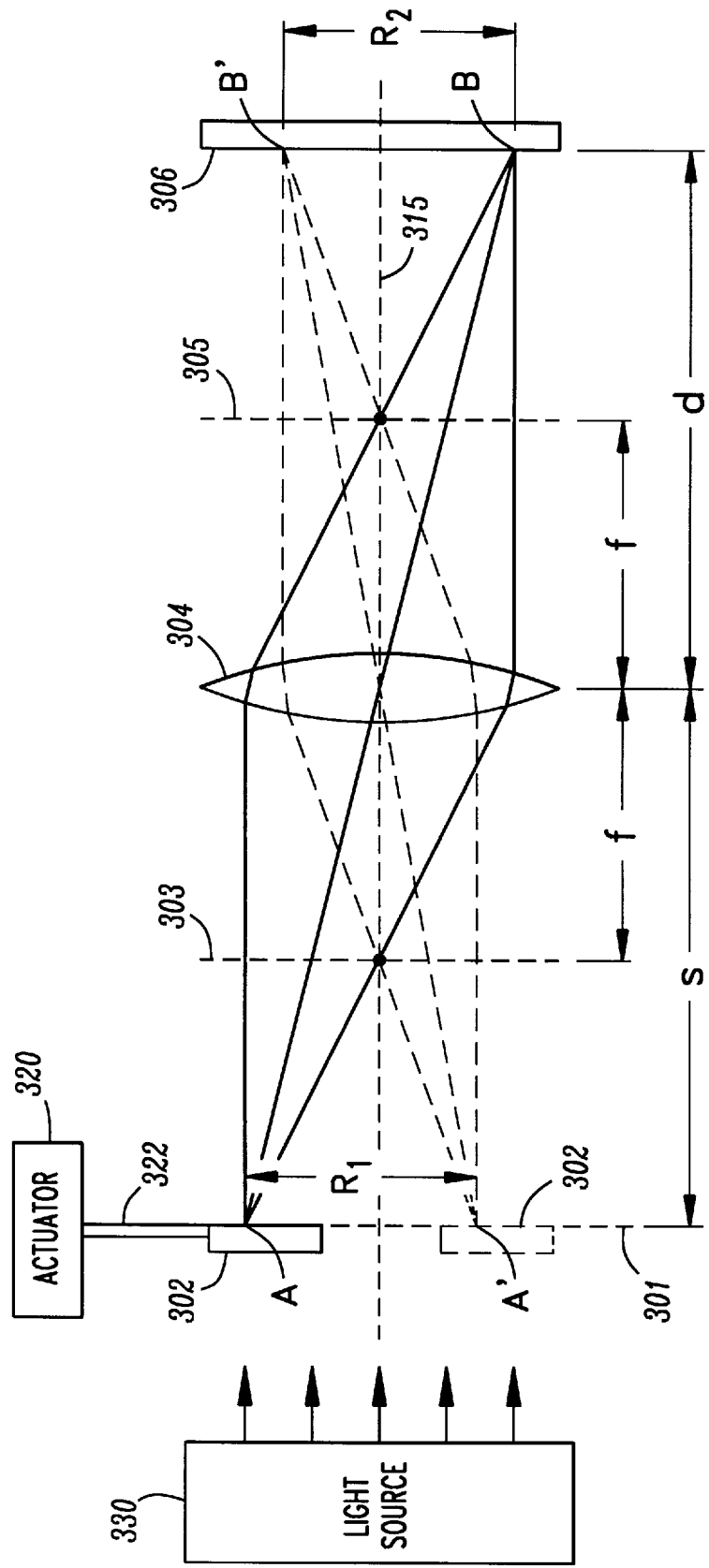
FIG. 3 illustrates a single lens imaging system according to a first embodiment of the present invention.

FIG. 3 illustrates single lens imaging system 300 according to a first embodiment of the present invention. Single lens system 300 comprises spatial light modulator (SLM) 302 and thin convex lens 304. SLM 302 comprises, for example, a liquid crystal display (LCD) screen on which data is encoded in a two-dimensional (2D) pattern of transparent and opaque pixels. SLM 302 may comprise a phase mask or a mask with mixed phase and amplitude modulation. As will be further explained below, SLM 302 is drawn in solid lines at a first or "original" position and is drawn again in dotted lines at a second or "translated" position. Also, for the purposes of simplicity and clarity in explaining the movements of SLM 302 in single lens imaging system 300, SLM 302 is shown small in size relative to lens 304 and to the spatial light modulators shown in previous figures. The reduced size is used in order to avoid confusion caused by overlapping portions of SLM 302 in the original and translated positions. However, this convenience should not be construed to place limitations on either the absolute dimensions or the relative dimensions of SLM 302, lens 304 and HMC 306.

SLM 302 and lens 304 are positioned orthogonally to optical path 315 (which may be an object beam or a reference beam), shown as a dotted line. Lens 304 has two focal points. A first focal point lies in plane 303, shown as a dotted line, one focal length, f, away from lens 304. On the opposite side of lens 304, a second focal point lies in plane 305, shown as a dotted line, one focal length, f, away from lens 304. If a thin lens having a focal length, f, is positioned at a distance, s, from an input object, the lens will form an output image at a distance, d, on the opposite side of the lens, according to the thin lens equation:

$$1/f=(1/s+1/d).$$

In the configuration shown in FIG. 3, the surface of SLM 302 lies in plane 301, indicated by a dotted line, at a distance, s, from lens 304, so that the output image of SLM 306 is formed at the surface of holographic memory cell (HMC) 306, at a distance, d, away from lens 304. In preferred embodiments of the present invention, s, d, and f are selected so that s=d=2f, and the total separation, s+d, between SLM 302 and its output image is therefore 4-f. SLM 302 may be moved along plane 301 in order to shift the position of its output image on HMC 306.

Light source 330 transmits a plane wave object beam, for example a coherent laser light beam, into and through the 2D-array pattern on SLM 302. Light beams, shown as solid lines, emanate from point A on the surface of SLM 302 in its original position and are incident on lens 304. Lens 304 converges the light beams emanating from point A to point B in the output image on HMC 306. Actuator 320 is coupled to SLM 302 by shaft 322, or any suitable mechanical coupling, and translates SLM 302 by an amount R1. Translating SLM 302 by R1 moves point A the corresponding distance R1 to point A'. Light beams, shown as dotted lines, emanate from point A' on the surface of SLM 302 in its translated position and are incident on lens 304. Lens 304 converges the light beams emanating from point A' to point B' in the translated output image on HMC 306. The distance, R2, from point B to point B' is given by the equation R2=−R1(d/s). In the embodiment described above, s=d=2f and R2=−R1.

Figure 4:
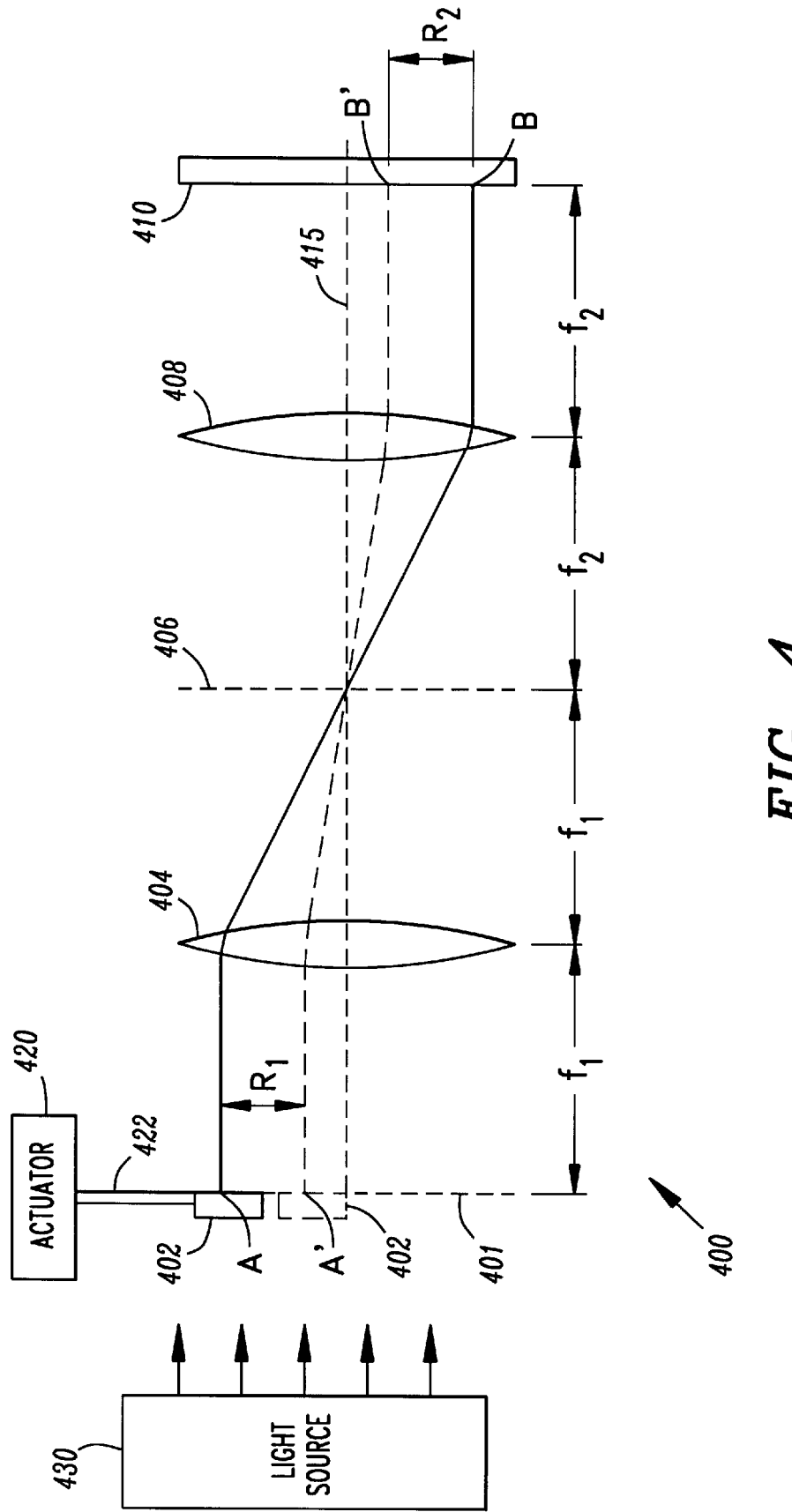
FIG. 4 illustrates a 4-f imaging system according to a second embodiment of the present invention.

FIG. 4 illustrates 4-f imaging system 400 according to a second embodiment of the present invention. 4-f imaging system 400 comprises spatial light modulator (SLM) 402, thin convex lens 404, which has a focal length, $f_1$, thin convex lens 408, which has a focal length, $f_2$, and holographic memory cell (HMC) 410. SLM 402 comprises, for example, a liquid crystal display (LCD) screen on which data is encoded in a two-dimensional (2D) pattern of transparent and opaque pixels. In an embodiment of the present invention, 4-f imaging system 400 is an infinite conjugate system and $f_2=f_1$, so that the total optical path length is 4-f.

Similarly to the system in FIG. 3, SLM 402 is drawn in solid lines at a first or "original" position and is drawn again in dotted lines at a second or "translated" position. Also, for the purposes of simplicity and clarity in explaining the movements of SLM 402 in 4-f imaging system 400, SLM 402 is again shown small in size relative to lenses 404 and 408. The reduced size is used in order to avoid confusion caused by overlapping portions of SLM 402 in the original and translated positions. Once again, however, this convenience should not be construed to place limitations on either the absolute dimensions or the relative dimensions of SLM 402, lens 404, lens 408 and HMC 410.

SLM 402, lens 404, lens 408 and HMC 410 are positioned orthogonally to optical path 415, shown as a dotted line. A representative light beam, shown as a solid line, emanates from point A on the surface of SLM 402 in its original position and is incident on lens 404. Lens 404 forms the Fourier transform of SLM 402 at Fourier focal plane 406, shown as a dotted line. The Fourier transform at Fourier plane 406 is the input object to lens 408, which forms a Fourier transform of its input object at the surface of HMC 410. The light beam emanating from point A is incident on HMC 410 at point B.

Actuator 420 is coupled to SLM 402 by shaft 422, or any suitable mechanical coupling, and translates SLM 402 by an amount R1. Translating SLM 402 by R1 moves point A the corresponding distance R1 to point A'. Light source 430 transmits a plane wave object beam, for example a coherent laser light beam, into and through the 2D-array pattern on SLM 402. A representative light beam, shown as a dotted line, emanates from point A' on the surface of SLM 402 in its translated position and is passes through lenses 404 and 408, as before. The light beam emanating from point A' is incident on HMC 410 at point B'. The distance, R2, from point B to point B' is given by the equation $R2=-R1(f_2/f_1)$. In a preferred embodiment of the present invention, $f_2=f_1$, so that R2=−R1.

The embodiments of the present invention described above illustrate movement of the spatial light modulator in one dimension. However, in alternate embodiments of the present invention, the spatial light modulator may be moved in two dimensions in an orthogonal axes system. In other embodiments of the present invention, the actuator may rotate the spatial light modulator by a displacement angle, θ, in the same plane as its surface to produce a corresponding rotation, θ, in the output image at the HMC. In still other embodiments of the present invention, the actuator may rotated and/or translated in any of six axes, including three orthogonal linear axes (X,Y,Z) and three angular axes (θ,φ,γ). Alternatively, in other embodiments of the present invention, the spatial light modulator may be held at a fixed position and the HMC may be translated and/or rotated instead.

The spatial light modulator may be translated and/or rotated by any known suitable mechanical means. The types and variety of actuator means are too numerous to describe here in detail. In any event, the specific type of actuator means used in any implementation to translate and/or rotate the spatial light modulator will usually depend to some degree on the requirements of the system in which it is incorporated.

In a preferred embodiment of the present invention, precisioncontrolled actuators are used to "fine tune" the position of the SLM's image on the HMC, while a separate and independent "coarse control" steering system is used to translate and/or rotate the SLM's image across comparatively longer distances on the HMC. Examples of suitable coarse control steering systems are disclosed in the applicant's co-pending applications.

Figure 5:
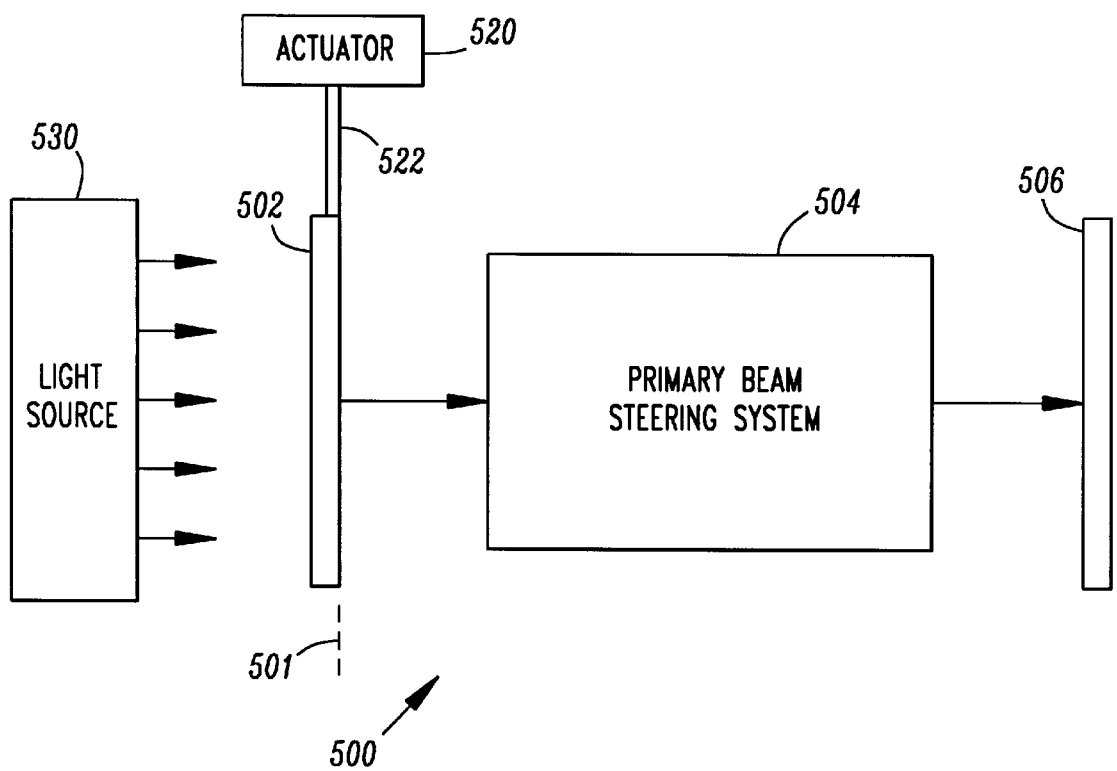
FIG. 5 illustrates a beam steering system according to a third embodiment of the present invention.

FIG. 5 illustrates beam steering system 500 according to a third embodiment of the present invention. Beam steering system 500 comprises light source 530, spatial light modulator (SLM) 502, primary beam steering system 504, HMC 506, actuator 520 and shaft 522. Primary beam steering system 504 comprises a coarse control steering system, which may be, for example, one described in the co-pending applications referenced above, that independently translates and/or rotates the output image or Fourier transform of the 2D-array pattern on SLM 502 across relatively large distances (magnitudes) on HMC 506. For a given setting of the beam position in primary beam steering system 504, SLM 502 may then be translated or rotated a relatively smaller distance (magnitude) on HMC 506, thereby providing vernier control for beam steering system 500.

The one-dimensional (1D) and two-dimensional (2D) beam steering systems may be further improved by utilizing a "mirror image" setup of mirrors and lenses on the opposing side of the HMC. In this way, data may be steered onto two sides of the HMC simultaneously. Additionally, a "mirror image" optical setup on the opposing side of the HMC may also be used to retrieve data from the HMC, if the spatial light illuminator is replaced with a two-dimensional array of light sensitive detectors.

Although the above-described beam steering systems are utilized to steer an object beam to selected positions on a HMC, this is by way of illustration only and should not be construed to limit the scope of the present invention in any way. Those skilled in the art will appreciate that the beam steering systems disclosed herein may be readily adapted to steer a reference beam instead.

Although the present invention has been described in detail, those skilled in the art should understand that they can make various changes, substitutions and alterations herein without departing from the spirit and scope of the invention in its broadest form.

What is claimed is:

1. A system for steering a complex, spatially-modulated incident beam of coherent light from a spatial light modulator to gain access to data locations in a holographic memory cell (HMC), comprising:

a primary beam steering system that receives said incident beam of light from said spatial light modulator and produces a resulting beam of light, wherein said primary beam steering system traverses said resulting beam of light across a plane of said HMC in increments having a first magnitude; and a fine-control translation mechanism, coupled to said spatial light modulator, that translates said spatial light modulator relative to said primary beam steering system to cause said resulting beam of light to traverse said plane of said HMC in increments having a second magnitude smaller than said first magnitude.

2. The system as recited in claim 1 wherein said fine control translation mechanism rotates said spatial light modulator.

3. The system as recited in claim 1 wherein said fine control translation mechanism linearly translates said spatial light modulator along a first axis.

4. The system as recited in claim 3 wherein said fine control translation mechanism linearly translates said spatial light modulator along a second axis orthogonal to said first axis.

5. The system as recited in claim 1 wherein said primary beam steering system linearly traverses said resulting beam of light.

6. The system as recited in claim 1 wherein said primary beam steering system rotates said resulting beam of light.

7. The system as recited in claim 1 wherein said HMC is substantially planar and said incident beam has a space bandwidth product (SBP) of at least 100.

8. A method of steering a complex, spatially-modulated incident beam of coherent light from a spatial light modulator to gain access to data locations in a holographic memory cell (HMC), comprising the steps of:

receiving said incident beam of light from said spatial light modulator in a primary beam steering system that produces a resulting beam of light;

traversing said resulting beam of light across a plane of said HMC in increments having a first magnitude; and translating said spatial light modulator relative to said primary beam steering system to cause said resulting beam of light to traverse said plane of said HMC in increments having a second magnitude smaller than said first magnitude.

9. The method as recited in claim 8 wherein the step of translating said spatial light modulator includes the step of rotating said spatial light modulator.

10. The method as recited in claim 8 wherein the step of translating said spatial light modulator linearly translates said spatial light modulator along a first axis.

11. The method as recited in claim 10 wherein the step of translating said spatial light modulator linearly translates said spatial light modulator along a second axis orthogonal to said first axis.

12. The method as recited in claim 8 wherein said primary beam steering system linearly traverses said resulting beam of light.

13. The method as recited in claim 8 wherein said primary beam steering system rotates said resulting beam of light.

14. The method as recited in claim 8 wherein said HMC is substantially planar and said incident beam has a space bandwidth product (SBP) of at least 100.

15. A system for storing data, comprising:

a coherent light source;

a spatial light modulator located to modulate a complex, spatially-modulated incident beam of coherent light having a space bandwidth product (SBP) of at least 100 received from said light source;

a substantially planar holographic memory cell (HMC) for storing said data;

a primary beam steering system that receives said modulated incident beam of coherent light from said spatial light modulator and produces a resulting beam of light, wherein said primary beam steering system traverses said resulting beam of light across a plane of said HMC in increments having a first magnitude; and a fine-control translation mechanism, coupled to said spatial light modulator, that translates said spatial light modulator relative to said primary beam steering system to cause said resulting beam of light to traverse said plane of said HMC in increments having a second magnitude smaller than said first magnitude.

16. The system as recited in claim 15 wherein said fine control translation mechanism rotates said spatial light modulator.

17. The system as recited in claim 15 wherein said fine control translation mechanism linearly translates said spatial light modulator along a first axis.

18. The system as recited in claim 17 wherein said fine control translation mechanism linearly translates said spatial light modulator along a second axis orthogonal to said first axis.

19. The system as recited in claim 14 wherein said primary beam steering system linearly traverses said resulting beam of light.

20. The system as recited in claim 14 wherein said primary beam steering system rotates said resulting beam of light.

* * * * *